W. L. Fish,
Sprinkling Pot.
No. 98,481. Patented Jan. 4, 1870.
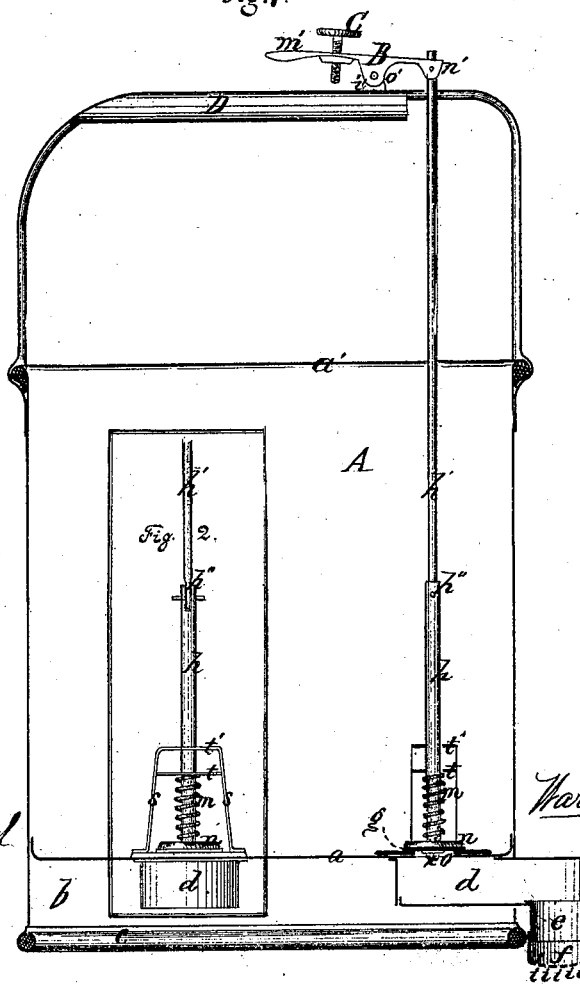

United States Patent Office.

WARREN L. FISH, OF SPRINGFIELD, MASSACHUSETTS.

Letters Patent No. 98,481, dated January 4, 1870.

IMPROVED SPRINKLING-POT.

The Schedule referred to in these Letters Patent and making part of the same

*To all whom it may concern:*

Be it known that I, WARREN L. FISH, of Springfield, in the county of Hampden, and State of Massachusetts, have invented a new and useful Improved Sprinkling-Pot; and I do hereby declare that the following is a full, clear, and exact description thereof, reference being had to the accompanying drawings, making a part of this specification, and to the letters of reference marked thereon, in which—

Figure 1 is a vertical section of my invention, showing a side view of the valve with the outlet, and Figure 2 is a rear view of the valve with its outlet.

My invention relates to a device for watering plants, and is applicable to all purposes for which the common sprinkling-pot is used, and is particularly desirable to use in watering tobacco-plants, after transplanting them; and It consists of a pot or vessel, of any desirable form and dimensions, in the bottom of which is placed a valve, said valve being made to open and close the outlet of the pot, by means of a lever placed upon a handle, or other convenient part of the pot, said lever being operated by the hand or finger, and is connected by a rod to the valve.

That others skilled in the art may be able to make and use my invention, I will proceed to describe its construction and the mode of its operation.

In the drawings—

A represents the pot or vessel, the lower end of which is at $c$, and is strengthened by wire, or by any other suitable means.

At any convenient point above the rim $c$ is inserted the bottom $a$, which should be secured in the cylinder A, water-tight.

An aperture, $o$, is made in the piece $a$, and below this orifice $o$, and connecting with it, is made a tube or conductor, $d\ e$, which, for convenience in seeing just where the water runs out, is brought through the side of the vessel, at its lower end.

The lower end of this tube or chamber $e$ is fitted with a cover, which is perforated at $i\ i\ i$.

On the top of the piece $a$, and upon each side of the outlet-aperture $o$, are secured properly the two braces $s\ s$, connected at the top by the pieces $t$ and $t'$, each of which is perforated, the rod $h$ passing through, and operating within the perforations made in said pieces $t$ and $t'$.

A small disk, $n$, is attached to the lower end of the rod $h$, and to render the disk more effective as a valve, a small piece of some flexible substance, as leather or rubber, may be attached to the lower side of the disk $n$.

A spiral spring, $m$, is placed upon the lower end of the rod $h$, between the bar $t$ and the disk $n$, and the said rod $h$ may extend up to the lever B, or it may be pivoted to the rod $h'$, as shown in the drawings.

I prefer the latter construction, as the valve or disk $n$ is then free to fit perfectly to its seat, by the pressure of the water and the spring $m$ above the disk.

The handle D is attached firmly to the top of the vessel, or to any other convenient part of the same.

A small projection, $i'$, upon the top of the handle, serves as a piece to which to pivot the lever B, said lever being pivoted or attached, at one end, to the upper end of the rod $h'$, while the other end of said lever is free to be operated by the thumb or finger.

A threaded hole is made through the lever B, into which is fitted a set-screw, C.

Having thus described the invention, I will now proceed to describe the mode of its operation.

The parts being together, as shown in the drawings, the vessel may be filled, and by pressing the thumb or finger upon the end $m'$ of the lever B, the rod $h$ is elevated, the bars $t$ and $t'$ serving as guides, to secure the rod in a proper vertical position, and the disk or valve $n$ is raised from its seat, when the water immediately passes out of the aperture $o$, chamber $d$, and tube $e$, and is separated into small jets or streams, in passing through the orifices $i\ i$, and the water continues to flow as long as the rod and disk $n$ remain elevated by the pressure upon the lever B, and by removing the pressure upon the lever, the spring $m$, its upper end impinging against the lower side of the bar $t$, forces down the disk $n$ to its seat, when the flow of water into and through the tube $d$ is cut off.

The drawings show the tube $d$ to be in the form of a chamber, with a short outlet-tube, $e$, attached, but the whole part $d\ e$ could be in the form of a bent tube, having a perforated end or cap, $f$.

It might be desirable to have the vessel made quite large, and of a suitable form to be carried upon the back or shoulder, and have a flexible tube attached to the outlet $e$, so that a large amount of water might be carried.

If the vessel be made sufficiently long, the perforated cap $f$ will be quite near the ground, as the vessel is carried in the hand, and in this way all the water which flows through the outlet is applied directly to the plant, without any waste of water, which is not the case with the watering-pots now in common use.

The rod $h'$ might pass down outside the vessel, and the valve be arranged in the tube $d$, and the lever B may be arranged, in various ways, to operate as an equivalent to that shown, but I prefer, for convenience and simplicity, the arrangement shown in the drawings.

To make a firmer seat for the valve, I attach a strengthening-piece, $n''$, to the bottom of the vessel, immediately around the outlet, so that the valve rests upon it, when pressed to its seat.

I am aware that sprinkling-pots have heretofore been used, and I do not claim the same, broadly; neither do I claim a valve, when considered separately; but, having described my invention, What I do claim as new, and desire to secure by Letters Patent, is—

A sprinkling-pot, with a valve $n\ o$, spring $m$, chamber $a$, tube $e\ f$, having openings $i$, lever B, and rod $h'$, all constructed and operating substantially as and for the purposes herein described and specified.

WARREN L. FISH.

Witnesses:
T. A. CURTIS,
C. E. BUCKLAND.